(12) United States Patent
Goldsack et al.

(10) Patent No.: US 10,193,892 B2
(45) Date of Patent: Jan. 29, 2019

(54) RESOURCE RESTRICTION

(71) Applicant: HEWLETT PACKARD ENTERPRISE DEVELOPMENT LP, Houston, TX (US)

(72) Inventors: Patrick Goldsack, Bristol (GB); Marco Casassa Mont, Bristol (GB); Simon Kai-Ying Shiu, Bristol (GB); Suksant Sae Lor, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 173 days.

(21) Appl. No.: 15/116,851

(22) PCT Filed: Mar. 14, 2014

(86) PCT No.: PCT/US2014/028697
§ 371 (c)(1),
(2) Date: Aug. 5, 2016

(87) PCT Pub. No.: WO2015/137975
PCT Pub. Date: Sep. 17, 2015

(65) Prior Publication Data
US 2016/0381036 A1   Dec. 29, 2016

(51) Int. Cl.
*G06F 21/00* (2013.01)
*H04L 29/06* (2006.01)
(Continued)

(52) U.S. Cl.
CPC ............ *H04L 63/105* (2013.01); *G06F 15/16* (2013.01); *G06F 21/00* (2013.01); *G06F 21/577* (2013.01);
(Continued)

(58) Field of Classification Search
CPC ......... H04L 63/105; G06F 15/16; G06F 21/00
(Continued)

(56) References Cited

U.S. PATENT DOCUMENTS 5,761,477 A  6/1998  Wahbe et al.
6,356,941 B1  3/2002  Cohen
(Continued)

FOREIGN PATENT DOCUMENTS

CN   101582894 A   11/2009
CN   102972005 A   3/2013
(Continued)

OTHER PUBLICATIONS

Amal Alsubaih and Alaaeldin Hafez, "Privacy Preserving Model in Semi-Trusted Cloud Environment," Proceedings of the International Conference on Cloud Computing and eGovernance, Jul. 25, 2013, pp. 24-28.
(Continued)

*Primary Examiner* — Anthony D Brown
(74) *Attorney, Agent, or Firm* — Hewlett Packard Enterprise Patent Department

(57) ABSTRACT

In one implementation, a data sharing system can comprise a trust engine to identify an environment that satisfies a level of trust, an access engine to request access to a set of data, a procedure engine to receive a procedure, a restriction engine to receive a restriction associated with a resource of the environment, a monitor engine to maintain resource utilization information, and a control engine to limit execution of the procedure based on the restriction and the resource utilization information. In another implementation, a method for sharing a set of data can comprise validating an environment satisfies a level of trust, receiving a restriction associated with a resource of the environment, receiving a procedure to access the set of data, ascertaining resource
(Continued)

utilization information, and providing a view of the set of data based on the restriction and the resource utilization information.

20 Claims, 5 Drawing Sheets

(51) Int. Cl.
*G06F 15/16* (2006.01)
*G06F 21/57* (2013.01)
*G06F 21/62* (2013.01)

(52) U.S. Cl.
CPC .......... *G06F 21/6218* (2013.01); *H04L 63/10* (2013.01); *G06F 2221/034* (2013.01); *G06F 2221/2149* (2013.01)

(58) Field of Classification Search
USPC .............................................................. 726/4
See application file for complete search history.

(56) References Cited

U.S. PATENT DOCUMENTS

| | | | |
|---|---|---|---|
| 6,546,546 | B1 | 4/2003 | Van Doorn |
| 7,376,974 | B2 | 5/2008 | Proudler et al. |
| 7,475,431 | B2 | 1/2009 | Chao |
| 8,468,244 | B2 | 6/2013 | Redlich et al. |
| 8,510,859 | B2 | 8/2013 | Zimmer et al. |
| 2004/0001218 | A1* | 1/2004 | Christiansen ......... G06F 3/1204 358/1.15 |
| 2007/0204166 | A1 | 8/2007 | Tome et al. |
| 2009/0216859 | A1 | 8/2009 | Dolling |
| 2009/0228950 | A1 | 9/2009 | Reed et al. |
| 2010/0115514 | A1 | 5/2010 | Maliszewski |
| 2010/0199104 | A1 | 8/2010 | Van Rijnswou |
| 2010/0284304 | A1 | 11/2010 | Mao et al. |
| 2010/0299313 | A1 | 11/2010 | Orsini et al. |
| 2011/0321134 | A1 | 12/2011 | Kotani |
| 2012/0042395 | A1 | 2/2012 | Jain et al. |
| 2012/0144040 | A1 | 6/2012 | Hacigumus et al. |
| 2012/0191716 | A1 | 7/2012 | Omoigui |
| 2012/0256914 | A1* | 10/2012 | Chevochot .......... G06F 17/5004 345/419 |
| 2013/0055335 | A1 | 2/2013 | Chien |
| 2013/0097625 | A1 | 4/2013 | Thorwirth et al. |
| 2013/0312116 | A1 | 11/2013 | Park |
| 2014/0006609 | A1 | 1/2014 | Gay et al. |

FOREIGN PATENT DOCUMENTS

| | | |
|---|---|---|
| CN | 103069429 A | 4/2013 |
| TW | I224919 B | 12/2004 |
| TW | 201337626 A | 9/2013 |

OTHER PUBLICATIONS

International Search Report and Written Opinion, International Application No. PCT/US2014/028697, dated Dec. 8, 2014, pp. 1-8, KIPO.

M.R. Asghar et al., "ESPOON: Enforcing Encrypted Security Policies in Outsourced Environments," 2011 Sixth International Conference on Availability, Reliability and Security, Aug. 22-26, 2011, pp. 99-108, IEEE.

Munawar Hafiz, "Security Patterns and Secure Software Architecture," OOPSLA Tutorial 51, Oct. 26, 2006, pp. 1-100, ACM.

Office Action, TW Application No. 104108086, dated May 11, 2016, pp. 1-8, TIPO.

Fred Kuhns, "OS Function," Mar. 21, 2013, pp. 1-15, Washington University in St. Louis, MO, USA, CSE522, Available at: <powershow.com/view/3c61d0NTliO/OS_Function_powerpoint_ppt_.

International Search Report and Written Opinion, International Application No. PCT/US2014/029030, dated Nov. 28. 2014, pp. 1-8, KIPO.

Office Action, TW Application No. 104108087, dated Feb. 26, 2016, pp. 1-9, TWPAT.

\* cited by examiner

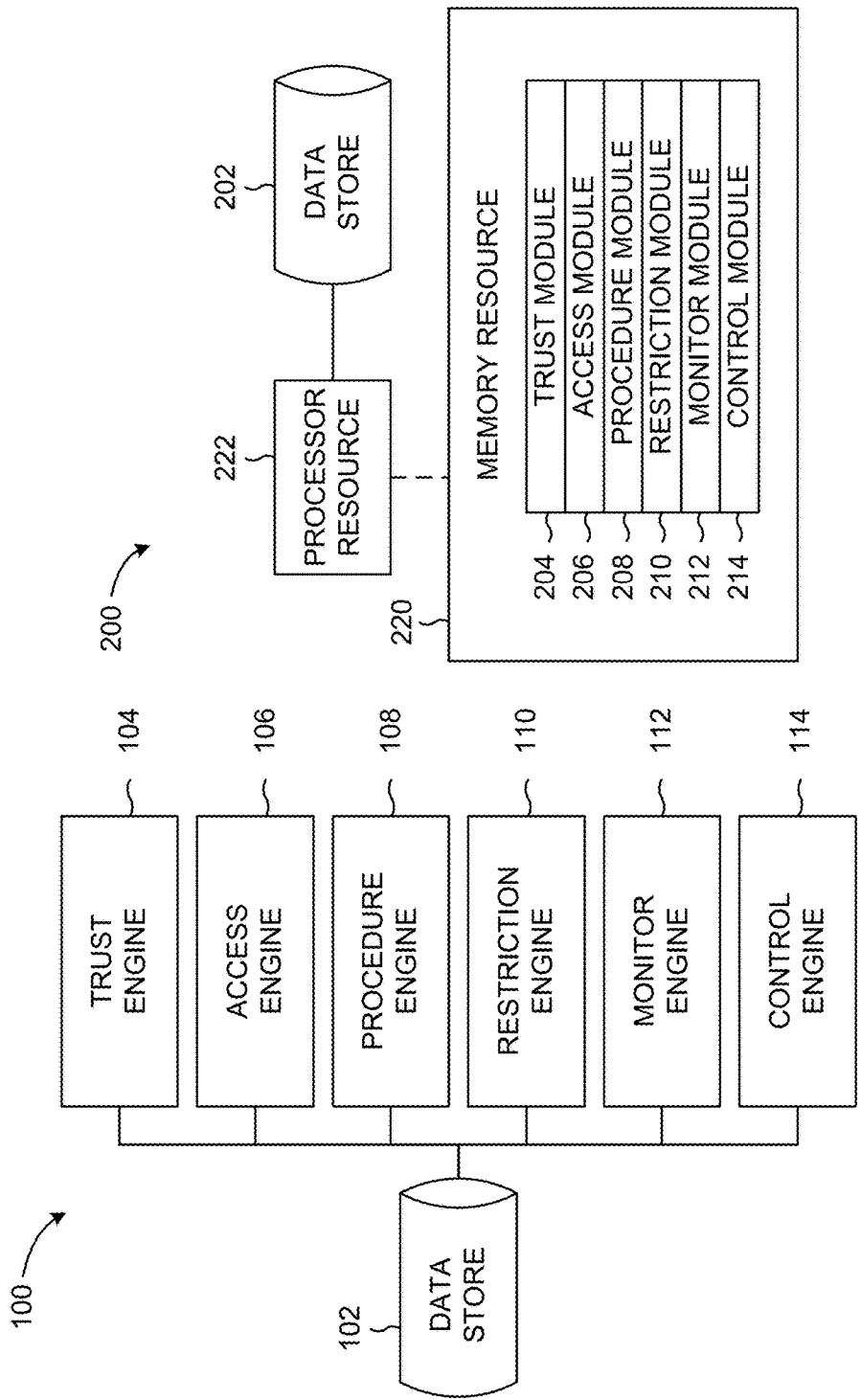

RESOURCE RESTRICTION

BACKGROUND

Data can be shared among entities. For example, data sharing can be performed between a first entity that provides access to a set of data for a second entity to view. Access to data can be controlled using access control parameters, such as access control lists ("ACL") of who may access the data. Based on access control parameters of a sharer (e.g. an entity providing the data to be accessed), an authorized sharee (e.g. an entity requesting access to the data) can access a data view (e.g. a transformation of the data for viewing, access, and/or use). Various views of the data can be provided to the sharee. For example, the sharee can be allowed to access all or part of the data view.

BRIEF DESCRIPTION OF THE DRAWINGS

FIGS. 1 and 2 are block diagrams depicting example data sharing systems.

DETAILED DESCRIPTION

Figure 3:
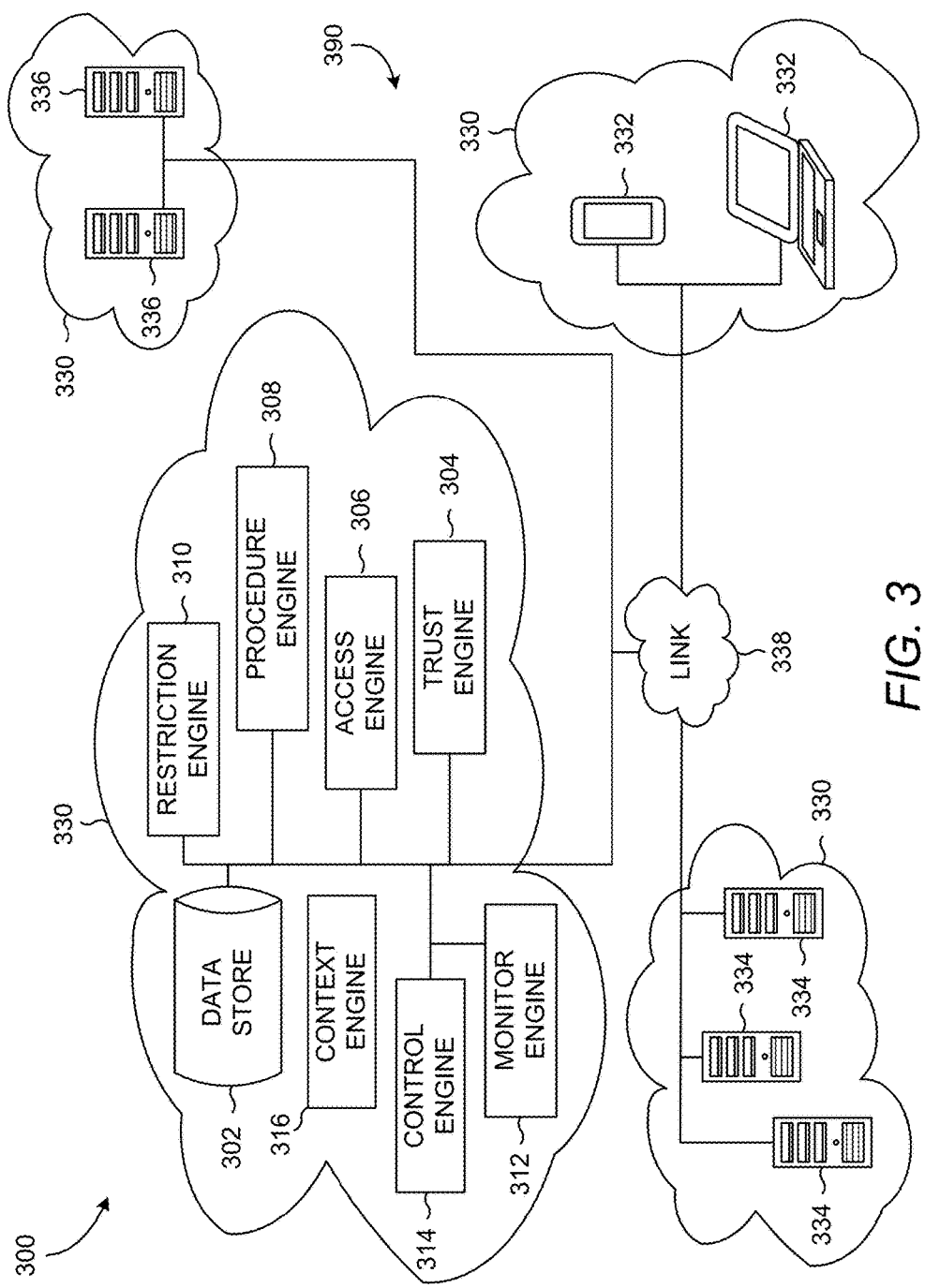
FIG. 3 depicts example environments in which various example data sharing systems can be implemented.

In the following description and figures, some example implementations of data sharing systems and/or methods for sharing a set of data are described. Data sharing can take place among many entities, such as data communities, and/or directly between two entities. In an environment where multiple entities share data, the data can be located in the possession of one entity or distributed across multiple entities, such as in a cloud environment. In general, an entity may desire to limit access to the data being held. For example, parts of the data can be confidential or otherwise limited for view and/or use based on legal compliance. As used herein, the term "access" refers to any interaction with data. The sharer (e.g. the owner of the data to be shared or an entity in charge of the data) can utilize access controls to attempt to restrict access to a data view of the data by the sharee. Once the data view is accessed by the sharee, however, the sharee can choose to use the data view without further control from the sharer as to how the data view is used. Access to data can depend on what is to be done with the data, and what other data has been accessed, and in turn restrict access to other data in the future. A sharee may attempt to request more data than permitted by the sharer or otherwise attempt to modify the transaction to obtain data to which the sharer did not intend for access by the sharee.

Various examples described below relate to sharing data based on a restriction associated with a resource of an environment performing the data share transaction. For example, the sharer can limit access to data by setting a resource limitation, such as a maximum number of central processing unit ("CPU") cycles, on the procedure requesting access to the data. As used herein, the term "restriction" is used to define a limit on access to data. By utilizing an environment with a resource restriction, a sharee can be limited in access to data when other security protocols have been subverted.

FIGS. 1 and 2 are block diagrams depicting example data sharing systems. Referring to FIG. 1, an example data sharing system 100 generally comprises a trust engine 104, an access engine 106, a procedure engine 108, a restriction engine 110, a monitor engine 112, and a control engine 114. In general, the system 100 utilizes the engines 104, 106, 108, 110, 112, and 114 to restrict a procedure for accessing a set of data in a trusted environment based on a resource of the trusted environment. The system 100 can include a data store 102 for storing the data used and/or produced by the engines of the system 100. The terms "include," "have," and variation thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus.

The trust engine 104 represents any combination of circuitry and executable instructions to identify a level of trust of an environment in relation to an entity. For example, a sharer may require a certain level of encryption of the data to trust the environment in which the data will be accessed. The trust engine 104 can identify an environment that satisfies a trust level where the trust level represents an amount of trust of an entity for participation in a compute transaction. A compute transaction is any appropriate electronic communication to compute a result based on access to data or otherwise involves sharing data, such as exchanging data among entities or processing a procedure to access data. "Identifying a level of trust of an environment" can include recognizing, establishing, determining, validating, verifying, providing, or otherwise ascertaining the trust level of the environment. The trust engine 104 can identify an environment based on multiple levels of trust, which can be based on multiple entities. For example, the trust engine 104 can validate that an environment satisfies a first level of trust of a first entity and a second level of trust of a second entity. The trust engine 104 can allow for a first entity (such as the owner of the data or a third party) to apply trust controls on a second entity. Any number of entities can participate in the transaction and may have a trust level to apply on the environment. For example, a first entity can own the data, a second entity can provide a procedure, a third entity can provide a restriction on the transaction, and a fourth entity can receive the result of the procedure, such as a data view.

The environment can include at least one of the first entity and the second entity. For example, the sharer, the sharee, or a combination thereof can be within the trusted environment. The environment can be trusted when the entity is associated with the environment. For example, the sharer may automatically trust the environment in which it exists. The entities can exist in separate or integrated compute environments. For example, the set of data can reside in a first compute environment with a first entity and the trusted environment can be a second compute environment where a second entity stores a procedure to receive a view of the set of data owned by the first entity. For another example, the trusted environment can include at least one of the first compute environment and the second compute environment. For yet another example, the trusted environment can be separate from a first compute environment of a first entity and a second compute environment of a second entity. A compute environment, as used herein, is any appropriate combination of circuitry and executable instructions to process a procedure, exchange electronic information, and otherwise support execution of a procedure associated with sharing data. Example compute environments include a computer, a cloud, a cluster of hosts, and a network of compute devices. A compute environment can include a resource or combination of resources that can be physical (such as a CPU, memory, and external devices) or virtual (such as files, network connections, and virtual instances of physical resources).

A transaction among entities can take place in an environment that is sufficiently trusted by each entity of the transaction. For example, a transaction can take place when the sharer trusts the data will be secure in the environment and the sharee can trust the procedure to access the data will not be accessible to the sharer.

The access engine 106 represents any combination of circuitry and executable instructions to request access to a set of data. For example, the access engine can request access to a set of data owned or otherwise associated with a first entity. The access engine 106 can be utilized by the trusted environment to access the set of data in a way trusted by the first entity. For example, the access engine 106 can utilize a level of encryption set by the owner of the data. Thus, a procedure to access the set of data can use the access engine 106 to access the data to ensure the transaction is secure rather than allowing the sharee to have direct access to the raw data. The access engine 106 can work in conjunction with the other engines 108, 110, 112, and 114 to provide an appropriate data view based on a restriction, as discussed herein.

The procedure engine 108 represents any combination of circuitry and executable instructions to receive a procedure and execute the procedure. For example, the procedure engine 108 can receive a procedure from a second entity that requests access to the set of data of a first entity. A procedure is any appropriate function that requests access to data. For example, a procedure of a second entity can request to return billing information of a set of customers, where the billing information is held by a first entity that has a trust level to obfuscate credit card information. The procedure engine 108 can execute the procedure based on a security protocol of the trusted environment. For example, the procedure engine 108 can ensure execution of the procedure in a manner isolated from the owner of the set of data. The procedure engine 108 can receive a procedure to request access to a set of data. The procedure engine 108 can modify the procedure to comply with a security protocol of the trusted environment based on the trust level of the entity supplying the procedure. For example, a second entity can supply the procedure when the second entity trusts that the procedure will not be available to the first entity that owns the data to be accessed. The procedure engine 108 can execute the procedure in the trusted environment when the procedure complies with the security protocol of the trusted environment.

The restriction engine 110 represents any combination of circuitry and executable instructions to receive a restriction associated with a resource of the environment. A restriction is any appropriate limitation on execution of the procedure and/or access to the data requested by the procedure. For example, the restriction can be a linguistic construct (in a language understandable by the trusted environment) to provide a constraint or other specification on a resource of the trusted environment, such as a logical expression to specify maximum resource utilization. In this way, the restriction is on the code of the procedure to access the data rather than the data itself. For example, the code to access a database is limited in the trusted environment in addition to security limitations from the database. A restriction can be provided to an environment as a logical expression via a data structure and/or an application programming interface ("API"). A resource of the environment can be any appropriate resource of the environment utilized in execution of the procedure, such as a compute resource. The restriction engine 110 can receive a restriction associated with the environment from an entity and/or an environment. For example, the restriction engine 110 can receive a restriction from the owner of the data or a third party overseeing the transaction. A restriction can limit the total information that can be accessed, the sophistication of any encodings used, and/or the total information returned to the sharee.

The resources can be at least one of a machine resource, a procedure resource, and a cloud resource. A machine resource is any appropriate resource associated with a physical component of the environment. For example, a machine resource can include CPU cycles, memory, input/output ("IO") communication, or an operating system resource. A procedure resource is any appropriate resource associated with the procedure during execution in the environment. For example, a procedure resource can include a maximum packet transfer size, a maximum number of objects, a maximum number of byte code, or a maximum data size to be returned or encoded. A cloud resource is any appropriate resource associated with a cloud service model of the environment. For example, a cloud resource can be a virtual machine, an application of software as a service ("SaaS"), a cluster of infrastructure as a service ("IaaS"), and a container of a platform as a service ("PaaS"). A higher level resource (such as a procedure resource or a cloud resource) can be mapped down to a lower level resource (such a machine resource) and a restriction can be placed on the environment at any appropriate level based on a language understandable by the environment. For example, a cloud resource can be constrained by a restriction at the machine resource level. For another example, the CPU cycles in an environment can by constrained by a cloud resource level on an environment that can understand and translate a natural language restriction.

The restriction can apply to at least one of an entity (e.g. a sharee), a time period, and an execution session. For example, the scope of the restriction can be at least one of per analytic computation, on a number of computations, and over a period of time. The restriction can be received from any entity of the transaction or a third party to the transaction, such as a third party hosting the trusted environment. For example, a first entity can place a restriction on a second entity regardless of whether the first entity is the owner of the data. For another example, a third party host can place a CPU utilization limit on the transaction between a first entity managing the data and a second entity supplying the procedure.

The monitor engine 112 represents any combination of circuitry and executable instructions to maintain resource utilization information of the environment associated with the resource. For example, the monitor engine 112 can monitor the resources of the trusted environment to track whether the utilization of the resources satisfies the restriction received by the restriction engine 110. Maintenance of resource utilization information can include adding, removing, updating, and/or modifying the resource utilization information. The monitor engine 112 can receive resource utilization information of the resource by monitoring the resource dynamically or on a schedule. The monitor engine 112 can provide a flag or other identifying functionality to signal the control engine 114 when a restriction on resource utilization has been satisfied. For example, the monitor engine 112 can send a message to the control engine 114 when the resource utilization information satisfies the restriction.

The control engine 114 represents any combination of circuitry and executable instructions to limit execution of the procedure based on the restriction and the resource utilization information. When a restriction is satisfied, the control engine 114 can terminate or otherwise limit the procedure from continuing to access the data via the access engine 106. The control engine 114 can return a result, such as a data view, based on the execution of procedure and the restriction. For example, the data view requested by the procedure may be one gigabyte and the monitor engine 112 can set a flag when the accessed data reaches a maximum 512 megabytes and return only the 512 megabytes to the procedure to produce a result for view, access, and/or use by the requesting entity. The control engine 114 can terminate the procedure or otherwise limit execution of the procedure when the resource utilization information satisfies the restriction and the result of the limited procedure can be a partial result based on an expected result of the procedure (e.g. if the procedure was to complete execution without the limitation by the control engine 114). For example, the monitor engine 112 can set a flag to signal the control engine 114 to stop allocation of CPU cycles to the procedure and return a partial view of the data that was available during the procedure until the flag was set.

FIG. 2 depicts the example data sharing system 200 can be implemented on a memory resource 220 operatively coupled to a processor resource 222. The processor resource 222 can be operatively coupled to a data store 202. The data store 202 can be the same as data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a trust module 204, an access module 206, a procedure module 208, a restriction module 210, a monitor module 212, and a control module 214. The processor resource 222 can carry out a set of instructions to execute the modules 204, 206, 208, 210, 212 and 214, and/or any other appropriate operations among and/or associated with the modules of the system 200. For example, the processor resource 222 can carry out a set of instructions to identify an environment that satisfies a trust level, receive a restriction associated with a resource of the environment, receive a procedure to request access to a set of data, execute the procedure in the environment, receive resource utilization information of the resource, and provide a result of the procedure based on the restriction and the resource utilization information. The trust module 204, the access module 206, the procedure module 208, the restriction module 210, the monitor module 212, and the control module 214 represent program instructions that when executed function as the trust engine 104, the access engine 106, the procedure engine 108, the restriction engine 110, the monitor engine 112, and the control engine 114 of FIG. 1, respectively.

The processor resource 222 can be one or multiple CPUs capable of retrieving instructions from the memory resource 220 and executing those instructions. Such multiple CPUs can be integrated in a single device or distributed across devices. The processor resource 222 can process the instructions, serially, concurrently, or in partial concurrence, unless described otherwise herein.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein, such as a trust level, a data view, procedure code, a restriction, a resource identifier, and context information, as discussed in the description of FIG. 3.

In the discussion herein, the engines 104, 106, 108, 110, 112, and 114 of FIG. 1 and the modules 204, 206, 208, 210, 212 and 214 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions.

In one example, the executable instructions can be part of an installation package that when installed can be executed by processor resource 222 to implement the system 200. In that example, the memory resource 220 can be a portable medium such as a compact disc, a digital video disc, a flash drive, or memory maintained by a computer device, such as service device 334 of FIG. 3, from which the installation package can be downloaded and installed. In another example, the executable instructions can be part of an application or applications already installed. The memory resource 220 can include integrated memory such as a hard drive, a solid state drive, random access memory ("RAM"), read only memory ("ROM"), electrically erasable programmable ROM ("EEPROM"), flash memory, or the like.

FIG. 3 depicts example environments in which various example data sharing systems can be implemented. The example environment 390 is shown to include an example system 300 for sharing data. The system 300 (described herein with respect to FIGS. 1 and 2) can represent generally any combination of circuitry and executable instructions to share data. The system 300 can include a data store 302, a trust engine 304, an access engine 306, a procedure engine 308, a restriction engine 310, a monitor engine 312, and a control engine 314 that are the same as the data store 102, the trust engine 104, the access engine 106, the procedure engine 108, the restriction engine 110, the monitor engine 112, and the control engine 114 of FIG. 1, respectively, and the associated descriptions are not repeated for brevity.

The system 300 can include a context engine 316. The context engine 316 represents any combination of circuitry and executable instructions to maintain a context of the environment associated with the procedure. The context is any appropriate combination of information related to the state of the machine and the order of execution of the procedure within a group of procedures, such as a workload. For example, the context can include state information of a mechanism executing the procedure within a session of procedures. For another example, the context can include resource utilization information of a resource of the environment. The context engine 316 can maintain the context associated with the environment and the procedure. The context can comprise the resource utilization information associated with a scope of the restriction associated with execution, such as a session including the procedure. The context engine 316 can generally track the resource context of the trusted environment to ensure the restrictions are applied correctly. For example, if a maximum CPU cycles for a session was achieved by the previous procedure, the context engine 316 can inform the system 300 that the restriction is already satisfied and limit execution of the procedure accordingly. For another example, the system 300 can determine not to execute any other procedures for the scope of the restriction (e.g. session or time period) based on the context and the restriction. The data store 302 can store the context for use in determining whether the restriction applies to an executing procedure.

The example environment 390 can include compute devices, such as user devices 332 and service devices 334 and 336. For example, user device 332 can provide a procedure to access data of service devices 334 by executing the procedure in a trusted environment hosted by service devices 336. The compute devices can be located on separate networks 330 or part of the same network 330. The example environment 390 can include any appropriate number of networks 330. The example system 300 can be integrated into a compute device. The system 300 can be distributed across compute devices or a combination of compute devices. The environment 390 can include a cloud computing environment. For example, networks 330 can be distributed networks comprising virtual computing resources or "clouds." Any appropriate combination of the system 300 and compute devices can be a virtual instance of a virtual shared pool of resources. The engines and/or modules of the system 300 herein can reside and/or execute "on the cloud" (e.g. reside and/or execute on a virtual shared pool of resources).

The service devices 334 and 336 represent generally any computing devices configured to respond to a network request received from a user device 332, whether virtual or real. For example, networks 330 can be cloud computing environments executing a SaaS model of storage resources available as service devices 334. For another example, a service device 334 can be a virtual machine of the network 330 providing a service and the user device 332 can be a compute device configured to access the network 330 and receive and/or communicate with the service. The user devices 332 represent generally any compute device configured with a browser or other application to communicate a network request and receive and/or process the corresponding responses.

A link 338 represents generally one or any combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, 112, and 114 of FIG. 1, and/or the modules of 204, 206, 208, 210, 212, and 214 of FIG. 2 can be distributed across devices 332, 334, 336, or a combination thereof. The engines and/or modules can complete or assist completion of operations performed in describing another engine and/or module. For example, the control engine 314 of FIG. 3 can request, complete, or perform the methods and/or operations of the control engine 314 as well as the trust engine 304, the access engine 306, the procedure engine 308, and the restriction engine 310. The engines of system 300 can perform the example methods described in connection with FIGS. 5-7.

Figure 4:
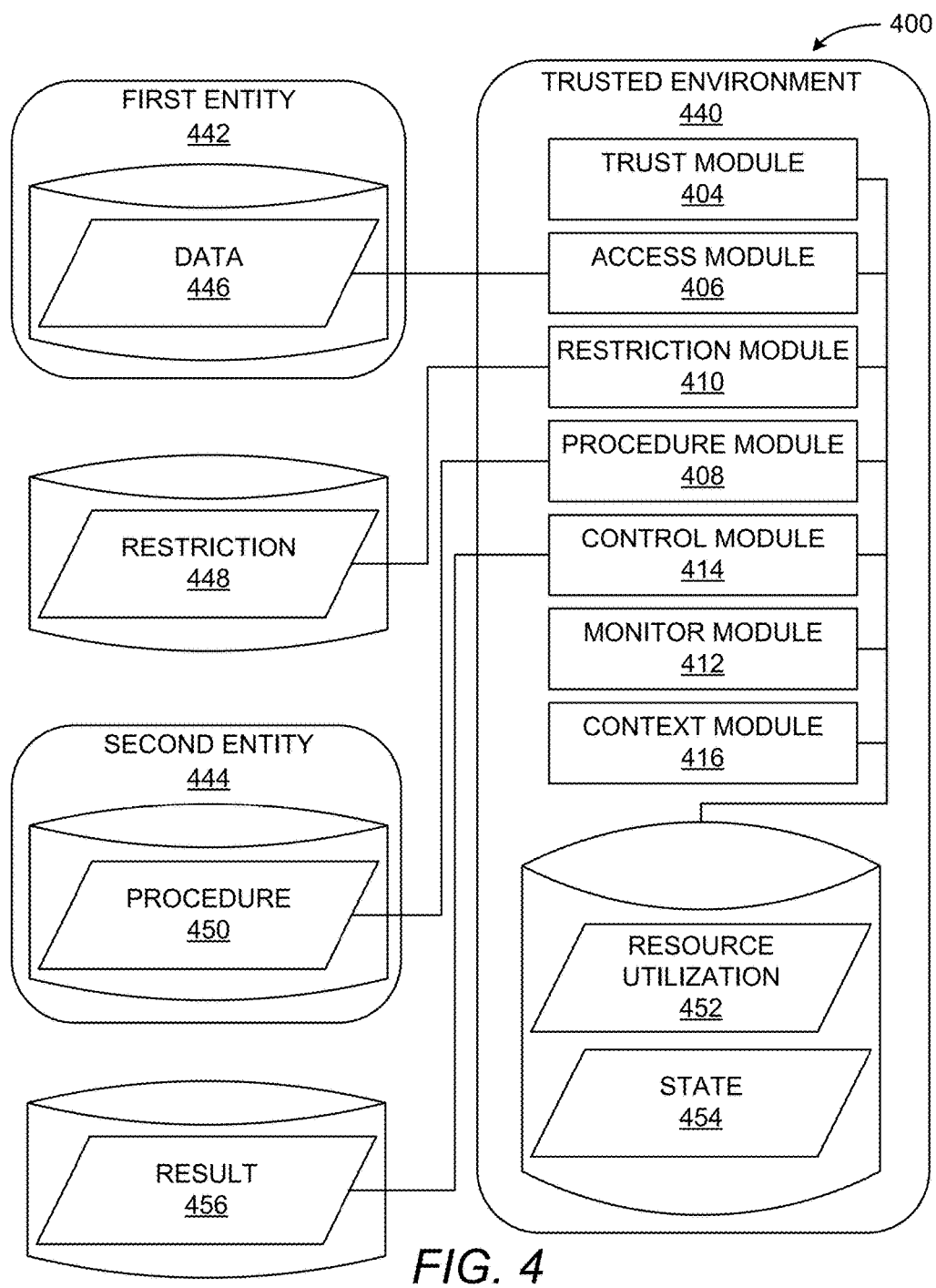
FIGS. 4 and 5 depict example modules used to implement example data sharing systems.
Figure 5:
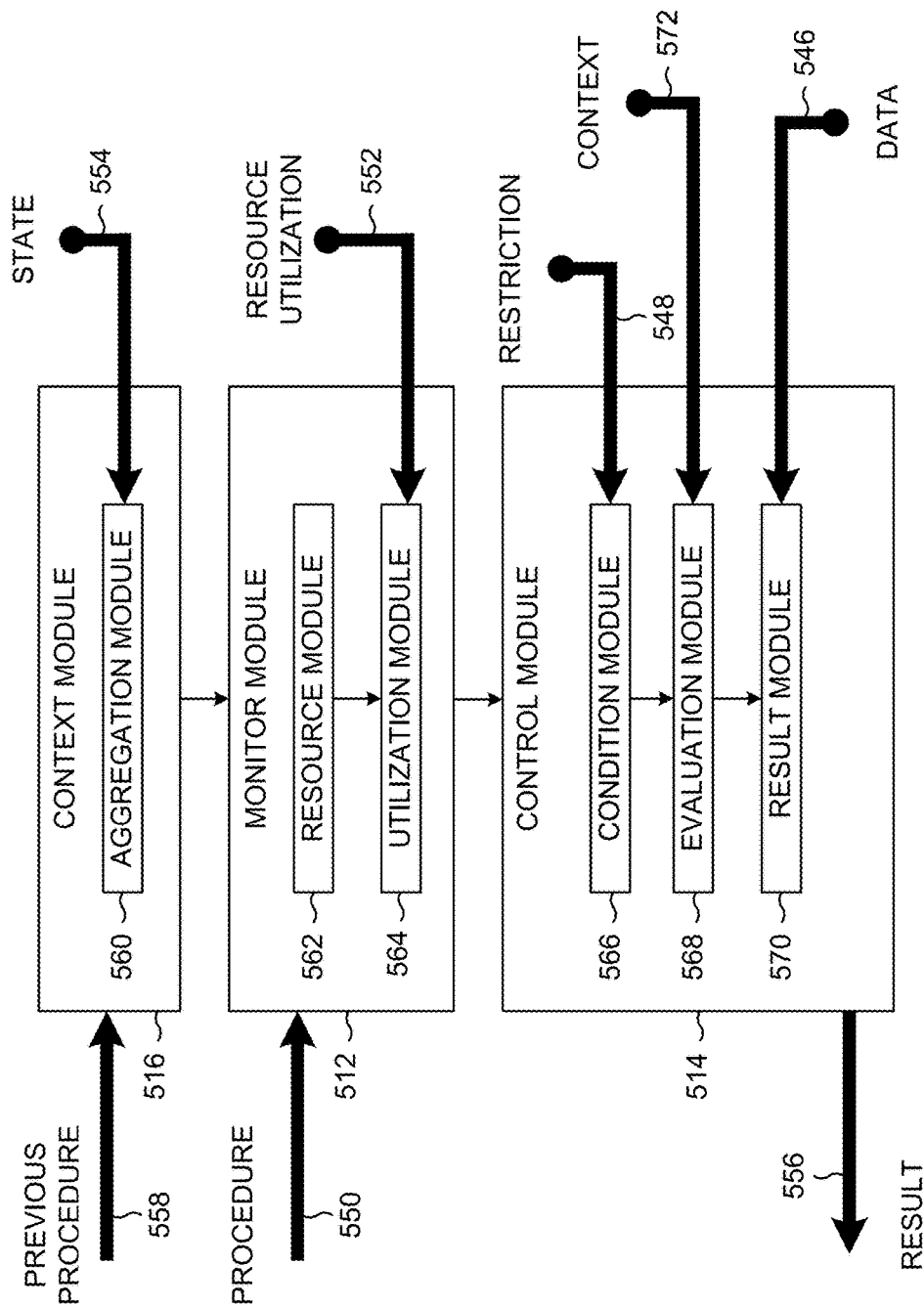

FIGS. 4 and 5 depict example modules used to implement example data sharing systems. Referring to FIG. 4, a trusted environment 440, such as a set of resources to execute a procedure based on a security policy, is shown as part of the system 400 for sharing data. The example system 400 of FIG. 4 generally includes a trust module 404, an access module 406, a procedure module 408, a restriction module 410, a monitor module 412, and a control module 414 that can be the same as the trust module 204, the access module 206, the procedure module 208, the restriction module 210, the monitor module 212, and the control module 214 of FIG. 2, respectively, and the associated descriptions are not repeated for brevity. The system 400 can include a context module 416 that represents program instructions that when executed function as the context engine 316 of FIG. 3 and the associated description is not repeated for brevity.

The trusted environment 440 is an environment that is sufficiently trusted by the entities of the transaction, such as a first entity 442 and a second entity 444. FIG. 4 depicts the trusted environment 440 as separate from the first entity 442 and the second entity 444. Other possible configurations include where the first entity 442 and the data 446 are within the trusted environment 440, the second entity 444 and the procedure 450 are within the trusted environment 440, and when the data 446 and the procedure 450, as well as the first entity 442 and the second entity 444, are within the trusted environment 440.

A first entity 442, such as a sharer, can own or otherwise manage a set of data 446 to be shared. A second entity 444, such as a sharee, can own or otherwise provide a procedure 450 to access the set of data 446. The trusted environment 440 can perform the data sharing transaction when the trust module 404 identifies that the trust level of each of entity of the transaction is met. For example, a third entity to receive the result 456 of the procedure 450 could provide a trust level to be satisfied by the trusted environment 440. Similarly, multiple entities could provide a trust level to be met. For example, the trust level could request a security protocol be used or could be a trust level of zero, such as where the second entity allows the procedure to be shared with anyone or the first entity allows unrestricted access to the data within the resource limits of the restriction 448.

The restriction 448 can be provided by the first entity 442, the second entity 444, or another entity or environment. Multiple restrictions, such as restriction 448, can be received by the environment. Similarly, the result 456 of the procedure 450 can be provided to the first entity 442, the second entity 444, or another entity or environment, and the result 456 can be provided to multiple entities and/or environments. The monitor module 412 can access resource utilization data 452 to identify when a resource achieves the restriction 448. The context module 416 can access the state 454 of the trusted environment 440, which may track the procedures executed in the trusted environment 440. The context of the trusted environment 440 can include the state 454 and the current resource utilization data 452. The control module 414 can limit the execution of the procedure 450 and/or the result 456 based on the context. For example, the result 456 can be a partial view of the data 446 when the context satisfies the restriction 448.

FIG. 5 depicts example modules used to implement example data sharing systems. The example modules of FIG. 5 generally include a context module 516, a monitor module 512, and a control module 514 that can be the same as the context module 416, the monitor module 412, and the control module 414 of FIG. 4. FIG. 5 depicts that the context module 516 can include an aggregation module 560; the monitor module 512 can include a resource module 562 and utilization module 564; and the control module 514 can include a condition module 566, an evaluation module 568, and a result module 570.

FIG. 5 depicts a consecutive procedures executing in the trusted environment. The procedures include a previous procedure 558 and a current procedure 550, similar to procedure 450 of FIG. 4. During execution of the previous procedure 558, the context module 516 can utilize the aggregation module 560 to keep track of the state 554 of the trusted environment. The aggregation module 560 represents program instructions that when executed function as a combination of circuitry and executable instructions to aggregate the state 554 of procedures. The aggregation module 560 can collect the state 554 of procedures, including previous procedure 558, to determine the state 554 of the trusted environment during a data sharing session, for example. Thus, when the procedure 550 begins execution, the control module 514 can take into account the state 554 as part of the whole context 572 of the procedure 550 in a data sharing session, for example.

The monitor module 512 can monitor the resources of the trusted environment using a resource module 562 and a utilization module 564. The monitor module 512 can monitor a resource, or a list of resources, associated with a restriction 548. The resource module 562 represents program instructions that when executed function as a combination of circuitry and executable instructions to identify the resources to be monitored. The utilization module 564 represents program instructions that when executed function as a combination of circuitry and executable instructions to identify resource utilization 552 of the resources identified by the resource module 562. The utilization module 564 can monitor a resource of the trusted environment based on a number, percentage, or classification. The resource utilization information 552 can be added to the context 572 used by the control module 514.

The control module 514 can provide a result 556, such as a data view of a set of data 546, based on the restriction 548 and the context 572. The condition module 566 represents program instructions that when executed function as a combination of circuitry and executable instructions to receive a restriction 548 and identify the condition to satisfy associated with the resource. For example, the restriction 548 can restrict the percentage of memory used during the specified scope of the restriction 548 (e.g. session or time period) and the condition for procedure 550 to satisfy to activate the limitation may be identified as requesting 128 MB of memory.

The evaluation module 568 represents program instructions that when executed function as a combination of circuitry and executable instructions to identify when the context 572 satisfies a condition of the restriction 548. For example, when the aggregation of the state 554 and the current resource utilization 552 satisfies the condition of a restriction 548, the control module 514 can return a view associated with execution of the procedure 550 up to the time of execution when the condition was satisfied. The result 556 provided by the control module 514 can be determined by the result module 570. The result module 570 represents program instructions that when executed function as a combination of circuitry and executable instructions to identify a data view of a set of data 546 based on the restriction 548 of a resource and the context 572. The result 556 returned by the control module 514 can be any appropriate view of the data 546 based on whether the context 572 of the resource satisfied the restriction 548. The view could be a full view of the data 546 or a partial view of the data 546.

Figure 6:
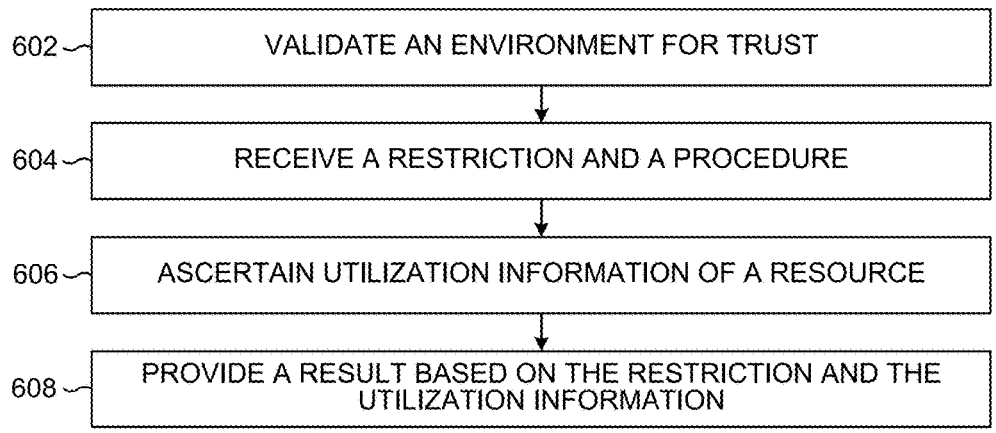
FIGS. 6 and 7 are flow diagrams depicting example methods for sharing a set of data.
Figure 7:
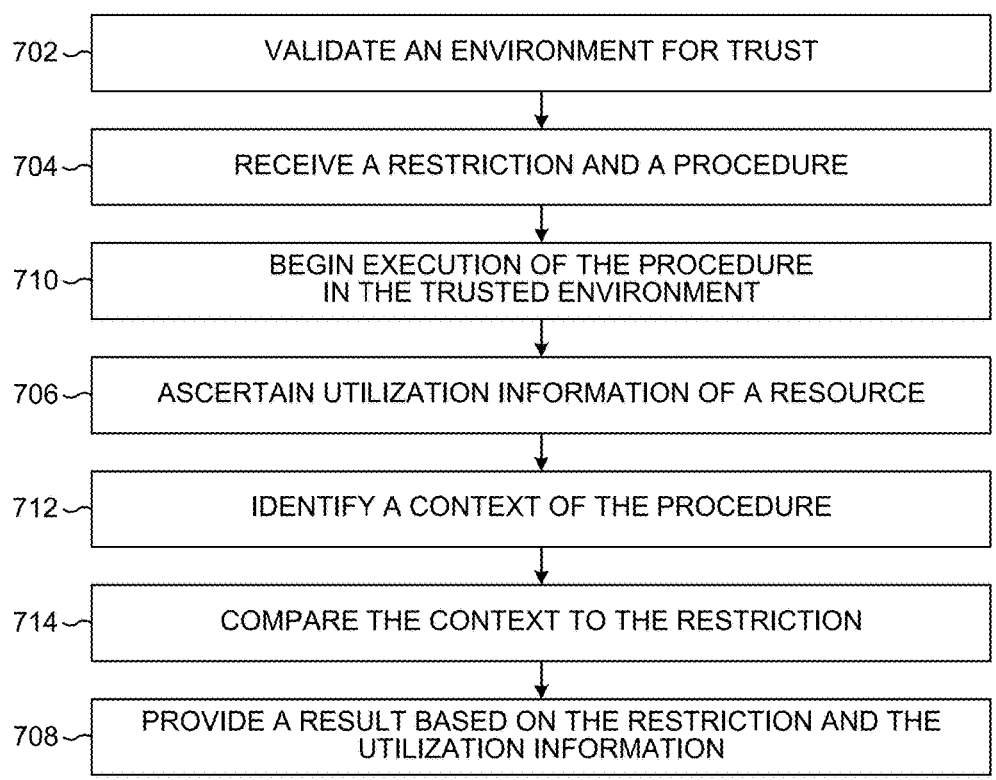

FIGS. 6 and 7 are flow diagrams depicting example methods for sharing a set of data. Referring to FIG. 6, example methods for sharing data generally comprise validating an environment for trust, receiving a restriction, receiving a procedure, obtaining utilization information of a resource, and providing a view of the set of data based on the restriction and the utilization information.

At block 602, an environment is validated for trust. An environment is validated for trust when it satisfies a level of trust of an entity. For example, an environment can be sufficiently trusted when it meets a level of trust between a first entity and a second entity.

At block 604, a restriction and a procedure are received. The restriction is associated with a resource of the environment in which the procedure is to execute. The procedure can request access to a set of data when executed in the trusted environment. The procedure can be received from an entity separate from the owner of the data. For example, a procedure from a second entity can access a set of data of a first entity.

At block 606, utilization information of the resource associated with the restriction is ascertained. The resource identified by the restriction can be monitored to ascertain the utilization level of the resource.

At block 608, a result of the procedure is provided based on the restriction and the utilization information. The result can be a view of the set of data accessed by the procedure. For example, the result can be a partial view of the data when the procedure satisfies the resource utilization condition of the restriction.

FIG. 7 includes blocks similar to blocks of FIG. 6 and provides additional blocks and details. In particular, FIG. 6 depicts additional blocks and details generally regarding executing the procedure in a trusted environment, identifying a context of the procedure, and comparing the context to the restriction. Blocks 702, 704, 706, and 708 are the same as blocks 602, 604, 606, and 608 of FIG. 6 and their respective descriptions are not repeated for brevity.

At block 710, the procedure can begin execution in the trusted environment. If the restriction has not already been satisfied previously in the scope of the restriction (e.g. session or time period), the procedure can execute in the trusted environment and begin to utilize a resource of the environment to execute the procedure. The environment can be separate from a first compute environment of a first entity, such as a sharer, and separate from a second compute environment of a second entity, such as a sharee. The data of the sharer is accessed during the procedure while the utilization information of a resource identified by the restriction does not achieve the condition of the restriction.

At block 712, a context of the procedure is identified. The context can include a state of the execution mechanism and the resource utilization information of the environment and/or execution mechanism. The context can be identified by aggregating the state and/or resource utilization information over the scope of the restriction, such as a number of computations or a time period. At block 714, the context can be compared to the condition of the restriction to determine if the context satisfies the restriction. For example, the amount of CPU cycles utilized during a session can be compared to the maximum number of CPU cycles provided by the restriction and if the amount exceeds the maximum, then the restriction can apply and limit the procedure appropriately, such as providing a partial view of the data based on the limitation. Thus, even when the security protocols are breached, the results of the procedure can be limited based on resource utilization rather than falsely allowing an entire data set to be returned to a requesting entity.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A data sharing system comprising:
   a processor; and
   a non-transitory computer readable medium storing instructions executable by the processor, the instructions comprising:
   instructions to identify an environment that satisfies a first level of trust of a first entity and a second level of trust of a second entity, wherein the first entity and the second entity are different devices;
   instructions to request access to a set of data associated with the first entity in response to a procedure received from the second entity;
   instructions engine to execute the procedure in the environment, the procedure to request access to the set of data;
   instructions to receive a restriction from the first entity, wherein the restriction associated with a resource of the environment is to limit information that can be accessed in the set of data by the procedure of the second entity based on resource utilization information associated with the resource;
   instructions to maintain the resource utilization information of the environment associated with the resource; and
   instructions to limit execution of the procedure based on the restriction and the resource utilization information.

2. The system of claim 1, wherein the resource is at least one of:
   a machine resource associated with a physical component of the environment;
   a procedure resource associated with the procedure during execution in the environment; or
   a cloud resource associated with a cloud service model of the environment.

3. The system of claim 1, wherein the restriction applies to at least one of: the second entity, a time period, or an execution session, and a scope of the restriction is at least one of: per analytic computation, on a number of computations, or over a period of time.

4. The system of claim 3, comprising:
   instructions to maintain a context of the environment associated with the procedure, the context to include state information of a mechanism executing the procedure within a session of procedures.

5. The system of claim 1, wherein the environment comprises at least one of: the first entity or the second entity.

6. A non-transitory computer readable medium comprising a set of instructions executable by a processor resource to:
   identify an environment that satisfies a trust level, the trust level to represent an amount of trust of an entity for participation in a compute transaction;
   receive a restriction from the service device that modifies the procedure that is executed in the environment, wherein the restriction is to limit information that can be accessed in the set of data by the procedure of the second entity;
   receive a procedure from a user device to request access to a set of data associated with a service device;
   receive resource utilization information of the resource, wherein the restriction is associated with the resource utilization information; and
   provide a result of the procedure that is modified by the restriction and the resource utilization information.

7. The medium of claim 6, wherein the set of instructions is executable by the processor resource to:
   maintain a context associated with the environment and the procedure, the context to comprise the resource utilization information.

8. The medium of claim 6, wherein the set of instructions is executable by the processor resource to:
   terminate execution of the procedure when the resource utilization information satisfies the restriction, wherein the result of the procedure is a partial result based on an expected procedure result.

9. The medium of claim 6, wherein the set of data resides in a first compute environment and the view of the set of data is received by a second compute environment.

10. The medium of claim 9, wherein the environment includes at least one of: the first compute environment or the second compute environment.

11. A method for sharing a set of data comprising:
    validating, by a processor, an environment satisfies a level of trust between a first entity and a second entity, wherein the first entity and the second entity are different devices;
    receiving, by the processor, a restriction associated with a resource of the environment from the first entity;
    receiving, by the processor, a procedure from the second entity, wherein the procedure is to access the set of data of the first entity, wherein the procedure is modified by the restriction to limit information that can be accessed in the set of data by the procedure of the second entity;
    ascertaining, by the processor, resource utilization information associated with the restriction; and
    providing, by the processor, a view of the set of data based on the procedure that is modified by the restriction and the resource utilization information that is executed in the environment.

12. The method of claim 11, wherein the view is a partial view of the set of data.

13. The method of claim 11, comprising:
    beginning execution of the procedure in the environment, the environment to be separate from a first compute environment of the first entity and a second compute environment of the second entity; and
    accessing the set of data during the procedure.

14. The method of claim 11, comprising:
    identifying a context of the procedure, the context to include a state of the execution mechanism and the resource utilization information; and
    comparing the context to the restriction.

15. The method of claim 11, comprising:
terminating the procedure based on the resource utilization information and the restriction.

16. The system of claim 1, wherein the first level of trust comprises a level of encryption of the set of data.

17. The system of claim 1, wherein the instructions to identify an environment comprises instructions to apply trust controls on the second entity.

18. The system of claim 1, wherein the resource utilization information is monitored based on at least one of: a number, a percentage, or a classification.

19. The medium of claim 6, wherein the trust level comprises a level of encryption of the set of data.

20. The medium of claim 6, wherein the processor is to apply trust controls on the second entity.

* * * * *